United States Patent [19]

Fabris et al.

[11] 3,925,266
[45] Dec. 9, 1975

[54] FLEXIBLE POLYETHERURETHANE FOAMS WITH IMPROVED RESILIENCE

[75] Inventors: Hubert Jakob Fabris, Akron; Edwin Morgan Maxey, Kent, both of Ohio

[73] Assignee: The General Tire & Rubber Company, Akron, Ohio

[22] Filed: June 18, 1973

[21] Appl. No.: 371,179

[52] U.S. Cl. ............. 260/2.5 AM; 260/2.5 AC; 260/2.5 AJ; 260/2.5 AP; 260/2.5 AQ
[51] Int. Cl.² ......................................... C08J 9/04
[58] Field of Search .. 260/2.5 AM, 2.5 AP, 2.5 AQ, 260/2.5 AC, 2.5 AJ

[56] References Cited
UNITED STATES PATENTS

| | | | |
|---|---|---|---|
| 3,084,177 | 4/1963 | Hostettler et al. | 260/2.5 |
| 3,226,345 | 12/1965 | Saunders et al. | 260/2.5 |
| 3,285,879 | 11/1966 | Larson et al. | 260/2.5 |
| 3,476,933 | 11/1969 | Mendelsohn | 260/2.5 |
| 3,635,821 | 1/1972 | Treadwell | 260/2.5 |
| 3,655,597 | 4/1972 | Strassel | 260/2.5 |
| 3,730,919 | 5/1973 | McGinn | 260/2.5 |
| 3,738,953 | 6/1973 | Anorga et al. | 260/2.5 |
| 3,741,917 | 6/1973 | Morehouse | 260/2.5 |
| 3,775,350 | 11/1973 | Juhas | 260/2.5 |

Primary Examiner—Eugene C. Rzucidlo

[57] ABSTRACT

When certain low molecular weight compounds each having an amine group and a hydroxyl group or two amine groups which react with isocyanate groups at different defined rates are incorporated in small amounts into standard polyetherurethane foam formulations, the resulting foams have high resilience, low hysteresis loss, good flexlife, high load factor, drastically reduced compressions sets and inherent flame resistance.

11 Claims, No Drawings

FLEXIBLE POLYETHERURETHANE FOAMS WITH IMPROVED RESILIENCE

BACKGROUND OF THE INVENTION

Flexible polyetherurethane foams have experienced phenomenal commercial growth because of the variety of foam properties which can be controlled by the choice of ingredients and the method of preparation. For some time there has been a strong demand, primarily in the automotive and furniture industries, for low cost flexible cushioning foams which cold-cure fast enough for assembly line production, and which are flame retardant, preferably self-extinguishing. The development of special, highly reactive starting materials culminated in the evolution of a cold-cure process requiring less equipment, less energy and less labor than the commercial hot-cure processes. However, it has been found that this process and the resulting products are at least as sensitive to variations in process parameters as in conventional hot-cure processes.

It has now been found that by proper selection of components and conditions cold-cure flexible polyetherurethane foams can be prepared having high resilience, low hysteresis loss, good flexlife, high load factor, drastically reduced compression sets as determined by the various standard tests and inherent flame resistance requiring at most only small amounts of additional flame retardant. The combination of cushioning qualities comparable to high quality latex foams with the strength and oxidative stability characteristic to polyurethane foams and an unusually low flame spreading rating make these novel foams useful for automobile seats and furniture applications including mattresses.

SUMMARY OF THE INVENTION

This invention comprises a method for the preparation of a highly resilient flexible polyetherurethane foam consisting essentially of (1) mixing (A) 100 parts by weight of a polyalkyleneether polyol having from 2 to 4 hydroxyl groups per polymer molecule and having an average equivalent weight per hydroxyl group between about 1,000 and 4,000, preferably no greater than 2,500, said polyol (A) containing no more than 30 mol percent ethylene oxide mers, (B) a low molecular weight chain-extender containing per molecule two isocyanate-reactive functions, one function (a) being an amine which has an isocyanate-reaction halftime of no more than 30 minutes at 24°C., the other function (b) being selected from the class consisting of a hydroxyl group and primary and secondary amine groups and having an isocyanatereaction activity between 0.1 and 0.001 of the first function, said compound (B) being present in amounts sufficient to provide from 0.0015 to 0.03 weight equivalents of function (a) per 100 parts of polyol (A), (C) from 1 to 4, preferably 1.5 to 3, parts by weight of water, (D) an aromatic hydrocarbon diisocyanate present in an amount equivalent to 0.9 to 1.30, preferably 1.05 to 1.15, isocyanate groups per total hydroxyl and primary and secondary amine groups in (A), (B) and (C), (E), from 0.01 to 1.0 part by weight of a silicon-based surfactant, (F) 0.1 to 1 part by weight of a tertiary amine catalyst, (G) from 0 to 0.5, preferably 0.1 to 0.3, part by weight of an organotin compound and (H) from 0 to 10, preferably no more than about 5, parts by weight of a flame retardant and (2) allowing the resulting mixture to foam and cure.

This invention also comprises the foams derived from the above method.

DESCRIPTION OF THE PREFERRED EMBODIMENTS

The most widely accepted method of making flexible polyurethane foams is to react an organic polyisocyanate with a polyether polyol or other compound containing active hydrogen, i.e., a hydrogen that is active as measured and determined by the Zerewitinoff method JACS, vol. 49, p. 3181 et. seq. (1927). Optionally, other ingredients may be used such as water, auxiliary blowing agents, catalysts and surface active agents.

The polyalkyleneether polyols (A) employed herein are now well known in the art and are generally prepared by reacting a polyhydric alcohol, phenol or an amine with an alkylene oxide in the presence of a catalyst. The preferred reactants are polyhydric alcohols such as ethylene glycol, pentaerythritol, propylene glycol, 2,3-butylene glycol, 1,3-butylene glycol, 1,5-pentanediol, 1,6-hexanediol, glycerol, trimethylolpropane and mixtures thereof. Suitable alkylene oxides include ethylene oxide, propylene oxide, butylene oxide, amylene oxide, epichlorohydrin and mixtures of these. Other polyether polyols well known in the art can be included or substituted in the systems of this invention regardless of their methods of preparation. Mixtures of such polyols can also be employed.

If desired, a portion of the polyhydric alcohol can be replaced with another compound having at least two reactive hydrogen atoms, such as alkyl amines, alkylene polyamines, cyclic amines, amides and polycarboxylic acids. Suitable alkyl amines and alkylene polyamines include methylamine, ethylamine, propylamine, butylamine, hexylamine, ethylene diamine, 1,6-hexane diamine, diethylene diamine, and the like. Also, cyclic amines such as piperazine, 2-methyl-piperazine and 2,5-dimethylpiperazine can be used as well as amides such as acetamide, succinamide and benzene sulphonamide and other compounds containing active hydrogens.

The polyalkyleneether polyols usable in this invention have an average hydroxyl functionality of 2 to 4, preferably 2 to 3, and average equivalent weights of 1,000 to 4,000 per hydroxyl group. In the commercially available polyols of this type from 5 to 85 percent of the total hydroxyl groups usually are primary hydroxyl groups. Preferably, said polyols have a maximum number average molecular weight of about 6,500.

The preferred polyalkyleneether polyols usable in this invention are homopolymers of propylene oxide or copolymers of propylene oxide with other alkylene oxides. If ethylene oxide is a comonomer, it can be present in the final polyol in amounts up to 30 mol percent.

The low molecular weight chain extenders (B) employed herein are compounds which can have molecular weights as high as 500 or 600, but preferably no greater than about 160, and each of which contains two groups which are reactive with isocyanate groups. Of the two isocyanate-reactive groups one must be fast enough to cause immediate formation of urea groups leading to an immediate controlled viscosity increase of the foaming mixture before gelation. This viscosity increase affects bubble nucleation and growth and provides sufficient stabilization of the rising foam to eliminate or substantially reduce the need for larger amounts of surfactants than are claimed and which would decrease cell openness and resilience.

More specifically, this first more reactive group or function (a) is an amine group with a half-time at 24°C. of 30 minutes or less where half-time is the time for half of said groups to react in the absence of catalyst with an equivalent amount of phenylisocyanate as a 0.0783M solution in toluene. Such highly reactive groups are primary or secondary aliphatic or activated aromatic amine groups. The second isocyanate-reactive group or function (b) in the chain extenders is a hydroxyl group or an amino group with moderate activity, e.g., from about 0.1 to about 0.001 the activity of the first isocyanate-reactive group.

The preferred useful chain extenders are alkanol amines, such as 2-aminoethanol, 2-aminopropanol, 3-aminopropanol, 2-aminobutanol, 4-aminobutanol, N-methylaminoethanol, 2-(N-ethylamino)ethanol, 2-(N-methylamino)propanol, 3-(N-methylamino)propanol, 2-(N-ethylamino)propanol, 3-(N-ethylamino)propanol and the like, polyalkylene glycol amines, such as polyethylene glycol amine, and ortho- and para-diamino-substituted aromatic hydrocarbons, such as ortho- and para-phenylene-diamine, ortho- and paratoluylenediamine, 1,2-naphthylenediamine and the like.

The low molecular weight chain extenders (B) are used in amounts to provide from about 0.0015 to about 0.03, preferably about 0.005 to about 0.02, equivalents of function (a) per 100 parts of polyol.

Additional aromatic polyamines can be used in the foam formulations in amounts of 0 to .05, preferably 0.003 to 0.03 mole per 100 parts of polyol to increase urea content and load values of the foams without excessive reduction in resilience. Examples include m-phenylenediamine, m-toluylenediamine, benzidine, 4,4'-diaminodiphenylmethane and the like.

Water (C) in an amount about 1 to 4, preferably 1.5 to 3, parts by weight per 100 parts of polyol is added to the formulation to help produce carbon dioxide to develop foam structure. The water should be treated to remove impurities such as iron, calcium salts and other materials that produce hardness. Preferably, the water should be subjected to treatment with various zeolites and other molecular sieves or distilled to remove virtually all of the impurities.

While a wide variety of polyisocyanate compounds can be used in the polyurethane reaction as is well known in the art, the preferred polyisocyanates for this invention are the aromatic hydrocarbon diisocyanates (D) containing no more than about 30 carbon atoms, more preferably no more than about 15 carbon atoms, such as toluene-2,4- and -2,6-diisocyanates; diphenylmethane-p,p'or -m,m'-diisocyanates and their polymers; and di-isocyanatomethyl benzene. However, other organic diisocyanates and polyisocyanates can be included or substituted as is well known in the art. It is to be understood that mixtures of two or more di- and/or polyisocyanates can be employed as well as both monomeric and polymeric forms.

The isocyanate or isocyanates are employed in amounts sufficient to give 0.9 to 1.3, preferably 1.05 to 1.15, isocyanate groups per total functional groups in the polyol (A), the chain extender (B) and the water (C), i.e., the total hydroxyl groups, primary and secondary amine groups and molecules of water. These amounts correspond to an "Index" of 90 to 130, preferably 105 to 115, the Index being one hundred times the defined functional equivalence.

In the polyurethane reaction the isocyanate reacts with the polyol and water in the presence of a catalyst wherein the polyol reacts with some of the isocyanate to form a chain extended polyurethane, more of the isocyanate reacts with the water to form carbamic acid that breaks down to form a primary amine and carbon dioxide, the carbon dioxide expands the polyurethane into a cellular structure of foam, and the primary amine formed from the gas reaction reacts with further isocyanate to form a di-substituted urea which in turn may react with more isocyanate to form cross-linking biuret structures.

The surfactant (E) is employed to improve the cell structure and prevent collapsing of the foam during expansion of the pneumatogen. The preferred surfactants are the well-known commercial silicon-based materials including polymeric silanes, silcarbanes, siloxanes and the like and block copolymers incorporating such materials. The particularly preferred surfactants are the poly(diorganosiloxane) or silicone oils and soaps and some siloxane-oxyalkylene block copolymers such as those disclosed in U.S. Pat. No. 2,834,748.

While such surfactants have previously been used in amounts ranging from 0.1 to 5 parts by weight per 100 parts of polyol, in this invention these surfactants are used in amounts ranging from 0.01 to 1.0 part by weight or no more than about one-fifth the previous norm. With such small amounts of surfactant the structure of the surfactant is not as critical as in previous systems, but some do appear to work better than others. The simplest test for a given surfactant is to try it in a standard formulation and compare it with a surfactant known to be effective such as the commercial 5 cs. poly(dimethylsiloxane) fluid used in the Examples.

Catalysts are generally employed to accelerate the different reactions. The chain extension reaction, where the polyol and water react with isocyanate to produce the polyurethane, is accelerated by tertiary amines and certain metal compounds. In particular, combinations of tertiary amines (F) and organotin compounds (G) are used.

Examples of suitable tertiary amines (F) include triethylene diamine, tetramethyl butanediamine, $\beta$, $\beta'$-dimethylaminoethyl ether, triethylamine, N-methylmorpholine, N-ethylmorpholine, N,N-diethylethanolamine, N-coco-morpholine, 1-methyl4-dimethylaminoethylpiperazine, 3-methoxy-N,N-dimethylpropyl amine, N,N-dimethyl-N-isopropyl amine, N,N-diethyl-3-diethylaminopropyl amine and dimethyl benzyl amine.

Examples of suitable organotin catalysts (G) include primarily tin carboxylates such as dibutyl tin dilaurate, dubutyl tin di-2-ethylhexoate, stannous octoate, stannous oleate, diisobutyl tin bis(monobutyl maleate), di-n-butyl tin diacetate, di-2-ethylhexyl tin bis(2-ethylhexoate), tri-n-butyl tin acetate and dibutyl tin distearate and tin alkyls such as tetramethyl tin and tetra-n-butyl tin.

The tertiary amines (F) can be used in amounts ranging from 0.1 to 1 part by weight per 100 parts of polyol, and the tin compounds (G) are used in amounts ranging from 0 to 0.5, preferably 0.1 to 0.3, part by weight per 100 parts of polyol.

Auxiliary blowing agents or pneumatogens can be used to supplement the blowing action from the water reaction. Examples of usable pneumatogens include halogenated hydrocarbons such as monofluorotrichloromethane, dichlorodifluoromethane, trifluoromonochloromethane, 1,1,2-trichloro-1,2,2-trifluoroethane, dichlorotetrafluoroethane, ethylene chloride, methylene chloride, chloroform and carbon tetrachloride. Other useful foaming agents include lower molecular weight alkanes, such as methane, ethane, propane, pentane, hexane and heptane; alkenes such as ethylene and propylene; ethers such as ethyl ether and diisopropylether; mixtures thereof and the like. Generally, such pneumatogens are employed in amounts up to about 10 parts by weight per 100 parts by weight of the polyol.

Even though the foams of this invention exhibit inherently low flame spread, flame retardants (H) can be added to improve this property further. Any of the common flame retardants can be employed including those containing phosphorus and metal atoms, especially in view of the small amounts which are used. However, the preferred flame retardants are the halogenated hydrocarbons containing at least 0.2, preferably at least 0.25, halogen atom per carbon atom.

The preferred class of halogenated hydrocarbons usable herein is that made up of chlorinated paraffins, which are generally liquids so that there is no problem mixing them with the foam ingredients. A typical commercial chlorinated paraffin employed in some of the Examples below is a pale yellow, clear, viscous liquid having an approximate molecular weight of 530, an approximate density at 25°C. of 1.16 g./ml., an approximate viscosity at 25°C. of 25 poises, an approximate refractive index at 25°C. of 1.505, an approximate chlorine content of 42 percent by weight, equivalent to about 0.28 chlorine atom per carbon atom, and a thermal stability of 0.2 percent measured as the weight percent of hydrogen chloride, based on the weight of the chlorinated paraffin, evolved during four hours at 175°C.

It is also possible to use any of the class of chlorinated material made up of polyvinyl chloride (PVC) polymers that contain at least 0.4 chlorine atoms per carbon atoms, preferably about 0.5 to 0.7 chlorine atoms per carbon atom, but no more than about one chlorine atom per carbon atom. These polymers are generally finely divided solids and have an intrinsic viscosity from about 0.25 to 2.5, preferably from about 0.5 to 1.5, as measured in 0.3 percent by weight solution in cyclohexanone at 25°C. These polymers can be made by bulk, solvent, emulsion or suspension polymerization processes, preferably the suspension polymerization process. Since these materials are solids, it is necessary to disperse them in part of the polyol to insure proper mixing in the total composition.

The flame retardants usable in this invention are used in the range of 0 to 10 or more parts by weight per 100 parts of polyetherpolyol, but little if any significant improvement can be detected over about 5 parts.

Another ingredient which is optional but may be desirable in high resilience (HR) polyurethane foams comrpises a type of 3,000 to 6,000 molecular weight polyalkyleneether polyol in which a vinyl-type monomer has been polymerized resulting primarily in a fine particulate solid vinyl polymer dispersed in the polyol matrix. A typical example of such a material is sold commercially under the trademark NIAX 31-28 in which the polyalkyleneether polyol is a poly(propylene oxide) polyol. This ingredient appears to interfere with membrane stabilization in the HR polyurethane foams thereby insuring no need for any crushing step to open cells, such crushing step usually having a detrimental effect on resilience.

The various ingredients or components employed in the method of this invention can be mixed in any way so long as the isocyanate component (D) is essentially the last to be added. Such mixing is ameliorated if those components which are not easily mixable are pre-mixed with part of some other component. For example, any tin catalyst (G) because of the small amounts used is more easily evenly dispersed in a foam system if it is added as a pre-mix with a portion of the polyol (A). Similarly, any solid flame retardant (H) such as the PVC polymers is preferably added as a dispersion in a portion of the polyol (A), and the chain-extender (B) must be dissolved first in some of the polyol (A) or in some of the water (C) to be satisfactorily mixable.

Furthermore, it is preferable to pre-mix several components or portions thereof to improve the efficiency of this invention as well as, incidentally, to reduce the number of streams to be introduced into a mixing head on a production line. Preferably, the isocyanate (D) is added as a separate stream, any tin catalyst (G) is added as a separate stream, preferably as a dispersion in a portion of the polyol (A), and any flame retardant (H) is added immediately prior to foam production into one of these streams or as a part of one or two pre-mix streams containing the rest of the defined components. Preferably, components (B), (C), (F) and any other amine compound are pre-mixed, and component (E) and the remainder of component (A) are premixed with any other ingredients not otherwise included to form two more streams. The two pre-mix streams can be pre-mixed together if desired. Pre-mixes are particularly desirable if they are storage stable.

The chain-extender (B) can be reacted in situ with the isocyanate (D) as described above to form the desired urea groups or some or all of the chain-extender (B) can be pre-reacted, before addition to any stream, with a stoichiometric equivalent of isocyanate (D), i.e., an amount of isocyanate (D) sufficient to convert to urea all of function (a) in the selected amount of chain-extender (B). Such prereaction appears to provide an improvement in load factor in the foams of this invention, load factor being the ratio of 65% deflection load to 25% deflection load. It is preferable that where any chain-extender (B) is pre-reacted with isocyanate (D) that only about 10 to 50 percent of the total chain-extender (B) to be used so pre-reacted.

The method of this invention is useful for making HR slab foams but can be used to make molded foams if the components are mixed and poured into molds of metal, plastic, wood or the like which have been treated with suitable mold release agents. The resulting HR foams in either case are useful for mattresses, furniture cushioning and automobile seats.

The following examples are illustrative of the best presently known modes of carrying out the subject invention but are not intended to limit the invention the scope of which is delineated in the claims. Unless otherwise stated, all quantitative measurements are in parts by weight. EXAMPLE I In this example the following ingredients were employed:

A-1. A commercial poly(propylene oxide) triol having an average of 3 hydroxyl groups per molecule and an average equivalent weight per hydroxyl group of between 1,500 and 1,600.

A-2. A commercial polyalkyleneether triol having an average of 3 hydroxyl groups per molecule and an average equivalent weight per hydroxyl group of about 1000, about 95% of said hydroxyl groups being secondary hydroxyl groups.

A-3. A commercial polyalkyleneether triol like (A-2) but having 40 to 45% secondary hydroxyl groups.

A-4. A commercial polyalkyleneether triol like (A-2) but having an average equivalent weight per hydroxyl group of about 1500 and 50 to 60% secondary hydroxyl groups.

A-5. A commercial poly(propylene oxide) triol like (A-1) but having an average equivalent weight per hydroxyl group of between 1,300 and 1,400, about 95% of said hydroxyl groups being secondary hydroxyl groups.

B-1. Orthophenylenediamine
B-2. 2-aminoethanol
B-3. 2-N-ethylaminoethanol
C. Water
D. 80/20 isomer mixture of 2,4- and 2,6-toluene diisocyanate
E-1. A commercial siloxane oxyalkylene block copolymer surfactant (F1, 630) added as a 10 percent solution in (A-1)
E-2. A commercial 5 cs. poly(dimethylsiloxane) surfactant (DC-200)
F. Triethylenediamine
G. Stannous octoate added as a dispersion in part of corresponding triol.
H. The commercial liquid chlorinated paraffin described above (Cereclor 42) having an approximate molecular weight of 530 and an approximate chlorine content of 42 percent (J) Metaphenylenediamine Foams were prepared by handmixing the ingredients in the amounts shown and allowing the mixtures to foam and cure. Where ingredients were added as a solution or dispersion, the amount of the solvent or matrix is included with the principal portion employed. The resulting foams were then measured for density (lbs./ft.$^3$ of a 4×4×2 inches sample), 25% CLD (compression load deflection in lbs. on 4×4 inches sample surface), 65% CLD (compression load deflection in lbs. on 4×4 inches sample surface) and resilience (% ball rebound — ASTM D1564):

| Ingredients | I-1 | I-2 | I-3 | I-4 | I-5 | I-6 | I-7 |
|---|---|---|---|---|---|---|---|
| A-1 | 100 | 100 | 100 | 100 | 100 | 100 | 100 |
| A-2 | | | | | | | |
| A-3 | | | | | | | |
| A-4 | | | | | | | |
| A-5 | | | | | | | |
| B-1 | 1.0 | | | | 0.5 | 0.33 | |
| B-2 | | 0.6 | 1.2 | | | | 0.6 |
| B-3 | | | | 0.9 | | | |
| C | 2.0 | 2.0 | 2.0 | 2.0 | 2.0 | 2.0 | 2.0 |
| D (index= | 110 | 110 | 110 | 110 | 110 | 110 | 110 |
| E-1 | 0.5 | 0.5 | 0.5 | 0.5 | 0.5 | 0.5 | 0.5 |
| E-2 | | | | | | | |
| F | 0.5 | 0.5 | 0.5 | 0.5 | 0.5 | 0.5 | 0.5 |
| G | | | | | | | |
| H | | | | | | | |
| J | | | | | 0.5 | 0.67 | 1.0 |
| Density | 2.8 | 2.9 | 2.8 | 2.7 | 2.8 | 2.85 | 2.8 |
| 25% CLD | 4.7 | 5.0 | 4.9 | 3.8 | 5.8 | 6.7 | 6.8 |
| 65% CLD | 12.4 | 15.0 | 16.0 | 10.8 | 16.3 | 18.5 | 19.4 |
| Load Factor | 2.65 | 3.0 | 3.3 | 2.85 | 2.8 | 2.75 | 2.85 |
| Resilience | 73 | 66 | 68 | 68 | 67 | 65 | 63 |
| Ingredients | I-8 | I-9 | I-10 | I-11 | I-12 | I-13 | I-14 |
| A-1 | 100 | | | | | | |
| A-2 | | 100 | 100 | | | | |
| A-3 | | | | 100 | | | |
| A-4 | | | | | 100 | | 100 |
| A-5 | | | | | | 100 | |
| B-1 | 1.0 | | | | | | 1.0 |
| B-2 | | 0.7 | 0.7 | 0.7 | 0.7 | 0.7 | |
| B-3 | | | | | | | |
| C | 2.0 | 2.0 | 2.0 | 2.0 | 2.0 | 2.0 | 2.0 |
| D (Index= | 110 | 110 | 110 | 110 | 110 | 110 | 110 |
| E-1 | 0.5 | | | | | | |
| E-2 | | 0.025 | 0.025 | 0.025 | 0.025 | 0.025 | 0.025 |
| F | 0.5 | 0.5 | 0.5 | 0.5 | 0.5 | 0.5 | 0.5 |
| G | | 0.2 | 0.2 | 0.2 | 0.2 | 0.2 | 0.2 |
| H | | | | | | | |
| J | | | | | | | |
| Density | 2.72 | 2.2 | 2.2 | 2.3 | 2.6 | 2.4 | 2.6 |
| 25% CLD | 4.5 | 3.5 | 3.5 | 3.0 | 3.5 | 3.0 | 4.5 |
| 65% CLD | 12.0 | 10.0 | 8.4 | 8.5 | 10.0 | 7.5 | 11.5 |
| Load Factor | 2.7 | 2.86 | 2.4 | 2.83 | 2.86 | 2.5 | 2.56 |
| Resilience | 73 | 66 | 60 | 60 | 66 | 62 | 66 |
| Ingredients | I-15 | I-16 | I-17 | I-18 | I-19 | I-20 | |
| A-1 | 100 | 100 | 100 | 100 | 100 | 100 | |
| A-2 | | | | | | | |
| A-3 | | | | | | | |
| A-4 | | | | | | | |
| A-5 | | | | | | | |
| B-1 | 1.0 | 1.0 | 1.0 | 1.0 | 1.0 | 1.0 | |
| B-2 | | | | | | | |
| B-3 | | | | | | | |
| C | 2.0 | 2.0 | 2.0 | 2.5 | 3.0 | 3.5 | |
| D (Index= | 100 | 110 | 120 | 110 | 114 | 110 | |
| E-1 | 0.5 | 0.5 | 0.5 | 0.5 | 0.5 | 0.5 | |
| E-2 | | | | | | | |
| F | 0.5 | 0.5 | 0.5 | 0.5 | 0.5 | 0.5 | |
| G | 0.075 | 0.075 | 0.075 | | | | |
| H | | | | | | | |
| J | | | | | | | |

| | Runs | | | | | |
|---|---|---|---|---|---|---|
| Density | 2.75 | 2.52 | 2.6 | 2.16 | 1.95 | 1.65 |
| 25% CLD | 4.9 | 4.2 | 5.0 | 4.2 | 3.7 | 3.0 |
| 65% CLD | 14.0 | 12.0 | 14.5 | 11.0 | 10.5 | 8.2 |
| Load Factor | 2.86 | 2.86 | 2.9 | 2.62 | 2.84 | 2.73 |
| Resilience | 67 | 62 | 67 | 70 | 68 | 68 |

The actual amounts of TDI ranged from about 35 to 45 parts and generally fall in the range of 20 to 50 parts for the foams of this invention.

Similar results are obtained by substituting equivalent amounts of polymeric aromatic diisocyanates and pure aromatic diisocyanates.

EXAMPLE II

The following foam was prepared on a Sterling Alderfer Laboratory Foam Machine at ambient temperature and was measured like the foams in Example I.

| Ingredients | |
|---|---|
| A-1 | 100 |
| B-2 | 0.6 |
| C | 2.0 |
| D (Index= | 110 |
| E-1 | 0.5 |
| F | 0.5 |
| G | 0.075 |
| H | 5.0 |
| J | 1.0 |
| Density | 3.05 |
| 25% CLD | 6.5 |
| 65% CLD | 20.0 |
| Load Factor | 3.08 |
| Resilience | 69 |

In addition, this foam was flame tested by AATCC Test Method 34-1969 (vertical flame test) with the following results:

| | 3 sec. ignition | 12 sec. ignition |
|---|---|---|
| Afterflame (sec.) | 0 | 0 |
| Afterglow (sec.) | 0 | 0 |
| Burnlength (in.) | 0.3 | 1.7 |

EXAMPLE III

Foam machine runs similar to Example II were made using similar formulations:

| Ingredients | III-1 | III-2 |
|---|---|---|
| Stream 1 | | |
| A-1 | 95 | 95 |
| B-2 | 1.0 | 1.0 |
| C | 2.0 | 2.0 |
| D | — | 0.70 |
| E-2 | 0.025 | 0.025 |
| F | 0.5 | 0.5 |
| J | 0.5 | 0.5 |
| Stream 2 | | |
| A-1 | 1.5 | 1.5 |
| G | 0.15 | 0.45 |
| H | 5.0 | 5.0 |
| Niax 31–28 | 3.5 | 3.5 |
| Freon 11 | 1.0 | 1.0 |
| Stream 3 | | |
| D | 30.5 | 30 |

In the preparation of Stream 1 of run III-2 the polyol A11 was first mixed with 0.25 part of the 2-aminoethanol B-2, then the 0.7 part of the isocyanate D was added followed by the amine catalyst F, the metaphenylene diamine J and the rest of the 2-aminoethanol B-2.

This resulted in a markedly greater viscosity for Stream 1 of run III-2 than for Stream 1 of run III-1.

The following properties were determined as before:

| | III-1 | III-2 |
|---|---|---|
| Density | 2.80 | 2.85 |
| 25% ILD* | 24 | 21.5 |
| 65% ILD* | 60 | 68 |
| Load Factor | 2.50 | 3.17 |
| Resilience | 66 | 63 |
| Compression Set (%) (44 hr. at 158°F.) | | |
| 90% deflection | 4.0 | 4.0 |

*ILD loads in pounds as measured with a 50 square inch indentor foot on one large face of a 12″×12″×4″ foam sample.

EXAMPLE IV

Comparative foam machine runs similar to those in Examples II and III were made with the following formulations:

| Ingredients | IV-1 | IV-2 |
|---|---|---|
| A commercial 3500 mol. wt. polyoxypropylene triol | 100 | 100 |
| B-2 | 0.5 | 0.5 |
| C | 2.0 | 2.0 |
| D | 29.5 | 30.9 |
| E* | 1.0 | 1.0 |
| F | 0.3 | 0.3 |
| G | 0.25 | 0.35 |

*A commercial dimethylsiloxane-ethylene oxide-propylene oxide block copolymer surfactant In the run IV-2 the 2-aminoethanol B-2 was blended with the polyol, 1.4 parts of the isocyanate D was added, and then the other ingredients were added. There was an immediate increase in viscosity when the 1.4 parts of D was added.

The following properties were determined as before:

| | IV-1 | IV-2 |
|---|---|---|
| Density | 2.80 | 2.70 |
| 25% CLD | 6.08 | 4.80 |
| 65% CLD | 14.1 | 15.4 |
| Load Factor | 2.32 | 3.20 |

Similar comparative results are obtained when 2-N-ethylaminoethanol and polyethylene glycol amine (160 mol. wt.) are each substituted mol per mol for the 2-aminoethanol above.

EXAMPLE V

Four slab foam runs were made on a commercial production machine with a conveyor speed of 6 ft./min. and a pour rate corresponding to about 100 pounds of polyol per minute. The resulting slab foams or buns, which foamed and cured at ambient temperatures to a tack-free state in about 5 minutes, were 35 inches wide, 13 to 16 inches high and about 10 feet long. The formulations and resulting properties were as follows:

| Ingredients | V-1 | V-2 | V-3 | V-4 |
|---|---|---|---|---|
| Stream 1 | | | | |
| A-1 | 97 | 97 | 97 | 97 |
| Niax 31-28 | 3 | 3 | 3 | 3 |
| B-2 | 0.7 | 0.7 | 0.7 | 0.7 |
| C | 1.9 | 1.9 | 1.9 | 1.9 |
| E-2 | 0.025 | 0.025 | 0.025 | 0.025 |
| F | 0.5 | 0.5 | 0.5 | 0.5 |
| J | 1.0 | 0.75 | 1.0 | 0.75 |
| Stream 2 | | | | |
| G | 0.175 | 0.175 | 0.175 | 0.175 |
| Stream 3 | | | | |
| D (Index= | 110 | 110 | 105 | 105 |
| Density | 2.90 | 2.72 | 2.82 | 2.76 |
| 25% ILD* | 33.0 | 26.0 | 31.0 | 26.0 |
| 65% ILD* | 87.0 | 72.0 | 73.0 | 62.0 |
| Load Factor | 2.64 | 2.77 | 2.35 | 2.38 |
| Resilience | 67.5 | 72.0 | 69.5 | 70.0 |
| Compression Set (%) (44 hr. at 158°F.) | | | | |
| 75% deflection | 3.3 | 5.6 | 3.4 | 4.2 |
| 90% deflection | 3.8 | 6.3 | 2.7 | 4.3 |

*ILD in pounds as measured using a 50 square inch indentor foot on a large face of a 15" × 15" × 4" sample.

The resilience values were reduced by about 10% by heat aging and by about 20% by humid aging. Both heat and humid aging did not increase the 90% deflection compression set above 26%.

we claim:

1. A method for the preparation of a highly resilient flexible polyetherurethane foam consisting essentially of (1) mixing a foam formulation consisting essentially of (A) 100 parts by weight of a polyalkyleneether polyol having from 2 to 4 hydroxyl groups per polymer molecule and having an average equivalent wegith per hydroxyl group between about 1,000 and 4,000, said polyol (A) containing no more than 30 mol percent ethylene oxide mers, (B) a low molecular weight chain-extender containing per molecule two isocyanate-reactive functions and being selected from the group consisting of alkanol amines, polyalkylene glycol amines, ortho-diamino-substituted aromatic hydrocarbons and para-diaminosubstituted aromatic hydrocarbons, said compound (B) being present in amounts sufficient to provide from 0.0015 to 0.03 weight equivalents of its more active function per 100 parts of polyol (A), (C) from 1 to 4 parts by weight of water, (D) an aromatic hydrocarbon diisocyanate present in an amount equivalent to an index of 90 to 130, (E) from 0.01 to 1.0 part by weight of a silicon-based surfactant, and (F) 0.1 to 1 part by weight of a tertiary amine catalyst, and (2) allowing the resulting mixture to foam and cure.

2. A method in accordance with claim 1 wherein said foam formulation also contains (G) from 0 to 0.5 part by weight of an organotin compound.

3. A method in accordance with claim 1 wherein said foam formulation also contains (H) from 0 to 10 parts by weight of a flame retardant.

4. A method in accordance with claim 1 wherein polyol (A) has an average equivalent weight per hydroxyl group no greater than 2,500.

5. A method in accordance with claim 4 wherein chain-extender (B) has a molecular weight no greater than about 160 and is present in an amount sufficient to provide from about 0.005 to about 0.02 weight equivalents of its more active function per 100 parts by weight of polyol (A).

6. A method in accordance with claim 5 wherein diisocyanate (D) contains no more than about 30 carbon atoms and is present in an amount equivalent to an index of 105 to 115.

7. A method in accordance with claim 6 wherein said mixing step (1) is done by machine.

8. A method in accordance with claim 7 wherein at least 10 percent of chain-extender (B) is pre-reacted with a stoichiometric equivalent of diisocyanate (D) before being incorporated into the complete mixing step (1).

9. A highly-resilient flexible polyetherurethane foam with excellent compression set characteristics, said foam being prepared by the method of claim 7.

10. A method in accordance with claim 2 wherein flame retardant (H) is a halogenated hydrocarbon containing at least 0.2 halogen atom per carbon atom.

11. A method in accordance with claim 10 wherein flame retardant (H) is a liquid chlorinated paraffin.

* * * * *